United States Patent [19]

Inoue

[11] Patent Number: 4,658,163

[45] Date of Patent: Apr. 14, 1987

[54] ROTARY TO LINEAR CONVERTER EMPLOYING A LEAD SCREW, FOR USE IN A FLEXIBLE MAGNETIC DISK DRIVE OR THE LIKE

[75] Inventor: Kazuhiko Inoue, Tokyo, Japan

[73] Assignee: Teac Corporation, Tokyo, Japan

[21] Appl. No.: 840,872

[22] Filed: Mar. 18, 1986

[30] Foreign Application Priority Data

Mar. 25, 1985 [JP] Japan ................................ 60-42965[U]

[51] Int. Cl.[4] .............................................. H02K 7/06
[52] U.S. Cl. ...................................... 310/80; 310/83; 310/49 R
[58] Field of Search .............................. 310/49, 80, 83

[56] References Cited

U.S. PATENT DOCUMENTS

| | | | |
|---|---|---|---|
| 3,660,704 | 5/1972 | Paine | 310/80 |
| 3,678,481 | 7/1972 | Dalziel et al. | |
| 4,393,319 | 7/1983 | Bock | 310/83 X |
| 4,501,981 | 2/1985 | Hansen | 310/49 |
| 4,546,295 | 10/1985 | Wickham et al. | 310/80 X |
| 4,546,296 | 10/1985 | Washbourn et al. | 310/80 X |
| 4,546,297 | 10/1985 | Washbourn et al. | 310/80 X |
| 4,546,298 | 10/1985 | Wickham et al. | 310/80 X |
| 4,557,153 | 12/1985 | Ulbing | 310/80 X |

*Primary Examiner*—Donovan F. Duggan
*Attorney, Agent, or Firm*—Woodcock Washburn Kurtz Mackiewicz & Norris

[57] ABSTRACT

A device is disclosed for translating the bidirectional, incremental rotation of a disk drive motor of the electric stepping type into the reciprocating, stepwise displacement of a magnetic transducer head in a radial direction of a disklike record medium in a data transfer apparatus employing such record medium. The device includes a lead screw driven by the drive motor and extending parallel to the path of the transducer head. Slidably engaged in the helical groove in the lead screw is an engagement member, such as a ball or pin, which is supported on the head carriage of the data transfer apparatus for causing the linear travel of the transducer head in response to the rotation of the lead screw. The engagement member is affixed to a first cantilever spring on the head carriage, thereby to be biased into working engagement with the lead screw. A second cantilever spring on the head carriage acts on the first cantilever spring and coacts therewith to urge the engagement member against the lead screw. Also mounted to the head carriage, an adjusting screw butts on the second cantilever spring to make possible the fine adjustment of the resultant of the spring forces under which the engagement member is held against the lead screw.

5 Claims, 5 Drawing Figures

ROTARY TO LINEAR CONVERTER EMPLOYING A LEAD SCREW, FOR USE IN A FLEXIBLE MAGNETIC DISK DRIVE OR THE LIKE

BACKGROUND OF THE INVENTION

My invention relates to a device for translating rotary motion into linear motion, and more specifically to such a device employing a lead screw, together with means for fine adjustment of the preload under which an engagement member is slidably engaged in the helical groove in the lead screw. The rotary to linear converter in accordance with my invention has particular utility in conjunction with an apparatus for the transfer of information with flexible magnetic disks, now commonly referred to as floppy disks, wherein a magnetic transducer head is linearly moved back and forth in a radial direction of the floppy disk for track to track accessing in response to the bidirectional, incremental rotation of an electric stepping motor.

In floppy disk drives (FDDs) the bidirectional, incremental rotation of the stepping motor must be translated into the linear stepwise travel of the transducer head to enable the latter to access the individual tracks on the disk. As an example of known rotary to linear converter of the lead screw type used in FDDs, I cite U.S. Pat. No. 3,678,481 issued to Dalziel et al. As disclosed in this patent, the lead screw is driven by a bidirectional stepping motor. The bidirectional rotation of the lead screw is converted into the linear travel of the head carriage as a rigid stylus attached to the latter is spring loaded into sliding engagement in the thread or groove of the lead screw. The spring loading of the stylus, or of any quivalent engagement means such as a ball, is normally accomplished by a leaf spring cantilevered to the head carriage.

One of the problems with this type of rotary to linear converter is the adjustment of the spring preload under which the engagement means is held against the lead screw. Generally, the greater the spring force is, up to a limit, the more faithfully will the rotation of the lead screw translated into the linear travel of the head carriage. However, any unnecessarily great spring force will impose a correspondingly heavy load on the drive motor. A precise adjusetment of the spring force on the engagement means is therefore essential for the proper operation of the converter mechanism.

An obvious solution to this problem might be the use of an adjusting screw abutting against the back of the cantilever spring carrying the engagement means on its front side. By turning the adjusting screw in either direction, the spring together with the engagement means thereon would be variably moved toward and away from the lead screw. I object to this solution. The slightest turn of the adjusting screw would result in a substantial change in the spring force on the engagement means. No fine adjustment of the spring preload would be possible in this manner.

SUMMARY OF THE INVENTION

I have hereby found out how to make possible, in a rotary to linear converter of the type defined, the easy and precise adjustment of the preload under which the engagement means is sprung against the lead screw.

My invention may be summarized as a rotary to linear converter for translating the bidirectional rotation of a rotary actuator into the rectilinear reciprocation of a guided member along a predetermined path, as in a data transfer apparatus wherein the bidirectional rotation of a drive motor is translated into the rectilinear reciprocation of a head carriage in a radial direction of a disklike record medium. The rotary to linear converter comprises a lead screw to be driven by the rotary actuator and extending parallel to the predetermined path of the guided member, and an engagement member slidably engaged in a helical groove in the lead screw. For preloading the engagement member against the lead screw, I have employed two cantilver springs, both anchored to the guided member. Extending across the lead screw, the first cantilever spring carries the engagement member and urges the same against the lead screw. The second cantilever spring, on the other hand, acts on the first cantilever spring for urging the engagement member against the lead screw in coaction with the first cantilever spring. Also included is adjustment means to be mounted to the guided member for adustably varying the force exerted by the second cantilever spring on the first cantilever spring and, in consequence, the resultant of the forces of the first and second cantilever springs exerted on the engagement member for preloading the same against the lead screw.

The adjustment means may comprise an adjusting screw in abutment against the second cantilever spring. A turn of this adjusting screw results in a significantly less change in the resultant of the spring forces on the engagement member than if only one spring were employed for preloading the engagement member and directly acted upon by the adjusting screw. A fine adjustment of the total spring pressure on the engagement member is therefore easy.

The dual spring preloading suggested by my invention offers an additional advantage. Even if the adjusting screw is more or less slightly displaced from its preadjusted position, as during the shipment or use of the FDD, the total spring pressure on the engagement member will not vary so much as to appreciably effect the performance of the rotary to linear converter.

The above and other features and advantages of my invention and the manner of realizing them will become more apparent, and the invention itself will best be understood, from a study of the following description and appended claims, with reference had to the attached drawings showing the preferred embodiments of my invention.

DESCRIPTION OF THE PREFERRED EMBODIMENTS

I will now describe in detail the rotary to linear converter of my invention in an FDD environment, in which the converter is used for translating the bidirectional, incremental rotation of an electric stepping motor into the linear, stepwise, back and forth travel of a magnetic transducer head in a radial direction of the flexible magnetic disk.

Figure 1:
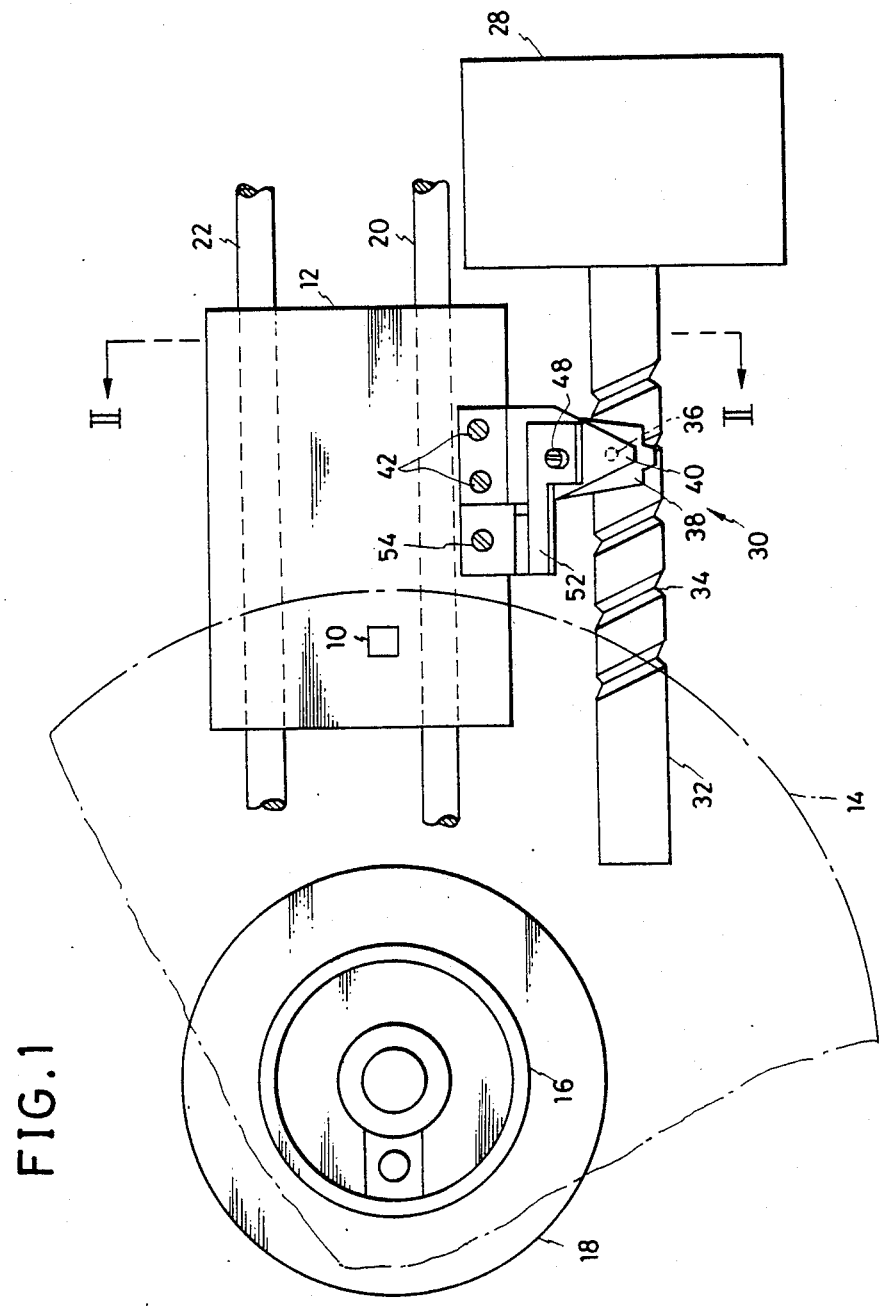
FIG. 1 is a diagrammatic plan view of the rotary to linear converter constructed in accordance with the novel concepts of my invention, the device being adated for use in an FDD and shown together with some associated parts of the FDD.

Shown at 10 in FIG. 1 is the transducer head assembly operatively mounted on a head carriage 12 for data transfer contact with the flexible magnetic disk shown fragmentarily and in phantom outline designated 14. The magnetic disk 14 is conventionally mounted on and clamped to a turntable 16 coupled directly to a disk drive motor 18. The head carriage 12 is movably mounted to a pair of parallel guide rods 20 and 22 thereby to be guided radially of the magnetic disk 14. As will be seen from FIG. 2, the guide rod 20 slidably extends through a hole 24 in the head carriage 12, whereas the outer guide rod 22 is slidably engaged in a groove 26 in the head carriage.

A head drive motor 28 of the electric stepping type is coupled to the head carriage 12 via a rotary to linear converter 30 in accordance with my invention. With the incremental rotation of the head drive motor 28, the converter 30 causes the head carriage 12 to travel stepwise on the guide rods 20 and 22, making it possible for the transducer head assembly 10 to access the individual recording tracks on the surface of the the magnetic disk 14.

Figure 2:
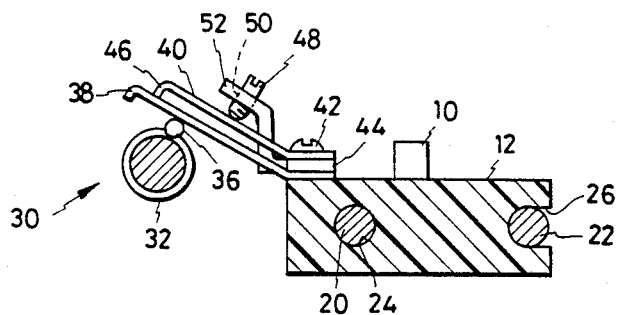
FIG. 2 is a vertical section through the rotary to linear converter of FIG. 1, taken along the line II—II therein.

As will be seen from both FIGS. 1 and 2, the rotary to linear converter 30 includes a lead screw 32 coupled to the head drive motor 28 and extending parallel to the guide rods 20 and 22. The lead screw 32 has a helical thread or groove 34 of V shaped cross section cut therein. I have employed in this particular embodiment a ball 36 of rigid, antifriction material as the engagement member slidably engaged in the helical groove 34 of the lead screw 32.

I hereby propose the use of two cantilever springs 38 and 40 for preloading the ball 36 into proper sliding engagement in the lead screw groove 34. The two cantilever springs 38 and 40 are anchored each at its proximal end to the head carriage 12 by a pair of screws 42, with a spacer 44 interposed between the proximal spring ends, and extend laterally from the carriage over the lead screw 32 approximately in right angular relationship thereto. The ball 36 is rigidly carried by the first cantilever spring 38 at a point closer to its distal end. Disposed over and extending parallel to the first cantilever spring 38 with a spacing therefrom, the second cantielver spring 40 has a head 46 at its distal end butting on the back of the first cantilever spring. The two cantilever springs 38 and 40 coact to bias the ball 36 against the lead screw 32.

For the adjustment of the forces to be exerted by the springs 38 and 40 on the ball 36, I have employed a simple screw 48 such as a headless slotted screw illustrated in FIGS. 1 and 2. The adjusting screw 48 is engaged in a tapped hole 50 in a screw support 52 and has its tip butting on the back of the second cantilever spring 40 at a point intermediate the opposite ends thereof. The screw support 52 is offset as better seen in FIG. 1 and is screwed at 54 to the head carriage 12. I recommend that the spring support 52 be formed in one piece with the spacer 44 to facilitate the assemblage of this rotary to linear converter 30.

Figure 3:
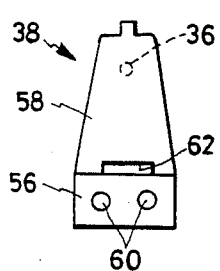
FIG. 3 is a plan view of the first cantilever spring of the device.

I have illustrated the first cantilever spring 38 in detail in FIG. 3. It comprises a generally flat base portion 56 of rectangular shape and a rather elongate major portion 58. The base portion 56 has defined therein a pair of clearance holes 60 for the passage of the mounting screws 42 therethrough. The major portion 58 has the ball 36 mounted to its underside. A slotlike aperture 62 defined transversely between base portion 56 and major portion 58 is intended to decrease the spring constant (i.e. the force required to cause the unit deflection of the spring) of the first cantilever spring 38. Since the first cantilever spring 38 is relatively wide at its base portion 56 and at the neighboring part of the major portion 58, and since the aperture 62 is located intermediate the opposite sides of the spring, the spring 38 is not to be easily torsioned despite its reduced spring constant. I have confirmed by experiment that the spring constant of the first cantilever spring 38, with the aperture 62 of the above explained shape and arrangement, is less than one third of that of a nonapertured cantilever spring having the same degree of susceptibility to torsion.

Figure 4:
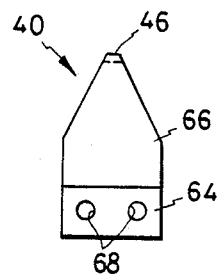
FIG. 4 is a plan view of the second cantilever spring of the device.

FIG. 4 is a detail illustration of the second cantilever spring 40. It also comprises a flat base portion 64 of rectangular shape, and a rather elongate major portion 66. The base portion 64 has a pair of clearance holes 68 defined therein for receiving the mounting screws 42. The major portion 66 tapers as it extends away from the base portion 64 in parallel spaced relation to the first cantilever spring major portion 58, terminating in the bend 46 butting on the first cantilever spring major portion. The length of the second cantilever spring major portion 66 must therefore be less than that of the first cantilever spring major portion 58. I recommend that the spring constant of this second cantilever spring 40 be made less than that of the first cantilever spring 38.

When mounted to the head carriage 12 as best depicted in FIG. 2 in the assemblage of this rotary to linear converter 30, and when the ball 36 is not butting on the lead screw 32, the centilever springs 38 and 40 occupy normal positions slightly displaced in a counterclockwise direction, as viewed in this illustration, from their FIG. 2 positions. The displacement of the cantilever springs 38 and 40 from their normal positions upon abutment of the ball 36 against the lead screw 32 as in FIG. 2 is so slight that the resultant of the spring forces exerted on the lead screw via the ball is as small as, say, 40 grams.

I have stated that the spring constant of the first cantilever spring 38 should be greater than that of the second cantilever spring 40. Of the noted 40 grams resultant of the spring forces under which the ball 36 is preloaded against the lead screw 32, 30 grams may be due to the first cantilever spring 38, and 10 grams to the second cantilever spring 40.

It should also be appreciated that the sum of the spring constants of both cantilever springs 38 and 40 can be reduced to approximately one third of the spring constant of the single cantilever spring that has heretofore been used for the same purpose. The relatively small spring forces acting on the lead screw 32 contributes to the reduction of the load on the stepping motor 28.

An additional advantage of my improved rotary to linear converter will manifest itself after an extended period of use of the FDD. Even though the relative positions of the lead screw 32 and ball 36 may change through wear, the spring pressure under which the ball is loaded against the lead screw will not change so much as if heavier spring means were employed.

An initial preload on the ball 36 may be adjusted by turning the adjusting screw 48 back and forth. As the thrust on the second cantilever spring 40 by the adjusting screw 48 is varied, so will be the combined spring force acting on the ball 36. Since the second cantilever spring 40 has a smaller spring constant than the first cantilever spring 38, the longitudinal displacement of the adjusting screw 48 does not result in any inconveniently large change in the spring preload on the ball 36, so that a fine adjustment of the spring preload is easier than heretofore. This advantage of my invention will become even more apparent when taken in light of the fact that there has conventionally been no second cantilever spring 40, with the adjusting screw acting directly on the first cantilever spring 38. The slightest displacement of the adjusting screw has resulted in a substantial change in the spring pressure according to the prior art.

Figure 5:
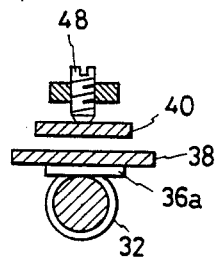
FIG. 5 is a vertical section through an alternative form of the rotary to linear converter in accordance with my invention.

In FIG. 5 I have shown a slight modification of the foregoing embodiment. A stylus or pin 36a is employed in this alternative embodiment in substitution for the ball 36 seen in FIGS. 1 and 2. The pin 36a is loaded against the lead screw 32 by the two cantilever springs 38 and 40, and the spring pressure on the pin is adjusted by the screw 48 acting on the second cantilever spring 40, as in the preceding embodiment. The other details of construction can be exactly as set forth above with reference to FIGS. 1 through 4. The pin 36a performs the same functions as the ball 36. In the appended claims, therefore, I have employed the term "engagement member" to mean any such member slidably engageable in the thread or groove of the lead screw.

Although I have shown and described my invention in terms of but one embodiment and a slight modification thereof, I do not wish my invention to be limited by the exact details of this disclosure, since a variety of modifications, alterations and adaptations will readily occur to the skilled artizans within the broad teaching hereof. For example:

1. The cantilever springs 38 and 40 could be straight, instead of being bent at the joints between the base and major portions, if the head carriage 12 and lead screw 32 were approximately in coplanar relation to each other.

2. Two or more adjusting screws might be employed.

3. Instead of providing the bend 46 at the tip of the second cantilever spring 40 for acting on the first cantilever spring 38, a separate member could be attached to the tip of the second cantilever spring so as to form a protuberance equivalent to the bend.

4. The spacer 44 could be omitted if the major portions 58 and 66 of the cantilever springs 38 and 40 were made to diverge apart from each other as they extend away from their base portions 56 and 64.

5. The cantilever springs 38 and 40, together with the ball 36 or pin 36a on the first spring 38, could be disposed on the underside of the lead screw 32.

6. The rotary to linear converter of my invention lends itself to applications other than the FDD, an example being an optical disk apparatus, where an optical transducer head assembly must be transported radially of the optical disk.

I claim:

1. A rotary to linear converter for translating the bidirectional rotation of a rotary actuator into the rectilinear reciprocation of a guided member along a predetermined path, as in a data transfer apparatus wherein the bidirectional rotation of a drive motor is translated into the rectilinear reciprocation of a head carriage in a radial direction of a disklike record medium, the rotary to linear converter comprising:
   (a) a lead screw to be driven by the rotary actuator and extending parallel to the predetermined path of the guided member, the lead screw having a helical groove cut therein;
   (b) an engagement member slidably engaged in the helical groove in the lead screw;
   (c) a first cantilever spring to be anchored to the guided member and extending across the lead screw, the first cantilever spring supporting the engagement member and urging the same against the lead screw;
   (d) a second cantilever spring also to be anchored to the guided member and acting on the first cantilver spring for urging the engagement member against the lead screw in coaction with the first cantilever spring; and
   (e) adjustment means to be mounted to the guided member for adustably varying the force exerted by the second cantilever spring on the first cantilever spring and, in consequence, the total force of the first and second cantilever springs under which the engagement member is urged against the lead screw.

2. The rotary to linear converter as recited in claim 1, wherein the first cantilever spring has a greater spring constant than the second cantilever spring.

3. The rotary to linear converter as recited in claim 1, wherein the first cantilever spring is adapted to be anchored at one end to the guided member and carries the engagement member adjacent another end thereof, and wherein the second cantilever spring is also adapted to be anchored at one end to the guided member and extends approximately parallel to the first cantilever spring, the second cantilever spring having another end adapted for acting on the first cantilever spring.

4. The rotary to linear converter as recited in claim 3, wherein the first cantilever spring is apertured in the vicinity of said one end thereof so as to have a smaller spring constant without reduction of its stability against torsional forces.

5. The rotary to linear converter as recited in claim 1, wherein the adjustment means comprises:
   (a) a rigid screw support to be affixed to the guided member and having a tapped hole defined therein; and
   (b) an adjusting screw engaged in the tapped hole in the screw support and having one end in abutting engagement with the second cantilever spring.

* * * * *